United States Patent [19]

Nuttle

[11] Patent Number: 4,552,484

[45] Date of Patent: Nov. 12, 1985

[54] COMPOSTING CONTAINER FOR FIELD USE

[76] Inventor: David A. Nuttle, 1316 Ravenhurst Dr., Raleigh, N.C. 27609

[21] Appl. No.: 568,701

[22] Filed: Jan. 6, 1984

[51] Int. Cl.⁴ .............................................. G21F 9/00
[52] U.S. Cl. ...................................... 405/128; 47/74; 47/47; 220/DIG. 30; 229/23 R
[58] Field of Search ......................... 405/128, 129, 53; 47/74, 47; 220/DIG. 30; 229/23 R, 23 BT

[56] References Cited

U.S. PATENT DOCUMENTS

| | | | |
|---|---|---|---|
| 2,567,706 | 9/1951 | Hannum et al. | 47/47 |
| 3,313,465 | 4/1967 | Geisler | 229/23 R |
| 3,521,741 | 7/1970 | Beaudry | 47/74 X |
| 3,586,624 | 6/1971 | Larson | 405/129 X |
| 3,705,659 | 12/1972 | Mackie | 47/74 X |
| 3,762,454 | 10/1973 | Wilkins | 220/DIG. 30 |
| 3,921,333 | 11/1975 | Clendinning et al. | 220/DIG. 30 |
| 3,929,937 | 12/1975 | Clendinning et al. | 47/47 X |

Primary Examiner—Dennis L. Taylor
Attorney, Agent, or Firm—Mills and Coats

[57] ABSTRACT

This invention is a system for field disposal of human feces through the use of composting containers that prevent the spread of intestinal bacteria, including virulent pathogens, which otherwise would occur when wilderness visitors practice shallow burial of feces. This is accomplished by providing biodegradable containers and following a pre-set method of disposal.

9 Claims, 5 Drawing Figures

COMPOSTING CONTAINER FOR FIELD USE

FIELD OF INVENTION

This invention relates to human waste disposal and more particularly to composting toilets for the disposal of human feces.

BACKGROUND OF INVENTION

Surface disposal of human feces in wilderness areas is not encouraged because of the chances of insect transmission of disease and the possibility of water contamination after a heavy rain. In areas with more than very light use, surface disposal of feces clearly is unacceptable. The advice given to wilderness visitors has been to bury feces in shallow "cat-holes". But recent studies reveal that shallow or deep burial of feces fails to result in quick destruction of pathogens. Bacteria numbers remain high for several weeks, and one type of bacteria survives over winter. This means that later campers and other visitors can have pathogens transferred to them by direct contact with feces, by insects, or by water. Providing toilet facilities in remote and primitive areas is not practical or economically feasible. The problem results in an increasing health hazard as more and more people visit our wilderness areas each year.

BRIEF DESCRIPTION OF INVENTION

After much research and study into the above-mentioned problems, the present invention has been developed to provide a safe and sanitary means of waste feces disposal.

The above is accomplished through the provision of a double walled corrugated paper box which is coated on the interior and exterior thereof. This box is provided with an inner top for temporary use and an outer top for permanent closure. The box is placed inside a polymart biodegradable plastic cover and the same is buried in the ground. When full, the top is closed, the plastic cover is pulled over the top, and a biodegradable courtesy flag marking the location is put up to warn subsequent visitors from digging in the same location.

In view of the above, it is an object of the present invention to provide a means to deter direct feces contact by other wilderness visitors.

Another object of the present invention is to preclude insects from coming into contact with waste feces.

Another object of the present invention is to reduce the possibility of water contamination by feces bacteria.

Another object of the present invention is to promote a composting process that will rapidly kill feces bacteria.

Other objects and advantages of the present invention will become apparent and obvious from a study of the following description and the accompanying drawings which are merely illustrative of such invention.

DETAILED DESCRIPTION OF INVENTION

With further reference to the drawings, the composting container of the present invention, indicated generally at 10, includes a box portion, indicated generally at 11, and a cover portion, indicated generally at 12.

Figure 5:
FIG. 5 is a cross sectional view of a typical wall section of the box portion of the present invention.

The box portion 11 is constructed preferably from double walled, corrugated paper material with the exterior of both walls being coated with a biodegradable material such as shelac. A typical cross section of the box portion 11 is shown in FIG. 5. Since box construction of this type is well known to those skilled in the art, further detailed description of the same is not deemed necessary.

The box portion 11 is formed from front and rear walls 13 and 14, and end walls 15 and 16. When in the storage and transport condition, the box can be flattened as for example along corners 17 and 18 with the inner top 19, outer top 20, and the bottom 21 being folded over against the sides and ends.

Figure 2:
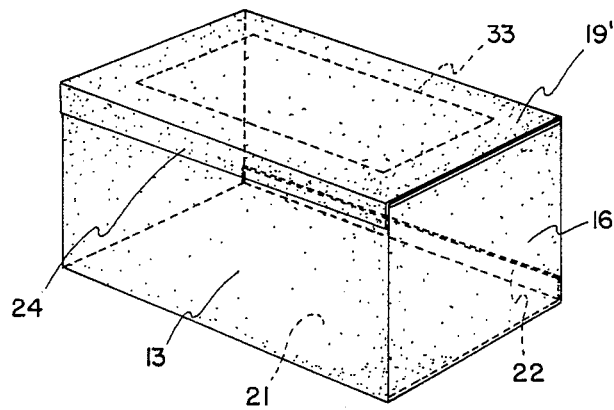
FIG. 2 is a perspective view of such box in closed position.

A bottom flap 22 is adapted to lie juxtaposed to and interiorly of rear wall 14 when the box portion 11 has been formed as shown in FIG. 2. An adhesive material on surface 23 of flap 22 can be used if desired to fix the bottom 21 in place.

A top flap 24 is provided on the edge of inner top 19 and folds down juxtaposed to front 13 when in the closed position.

Figure 4:
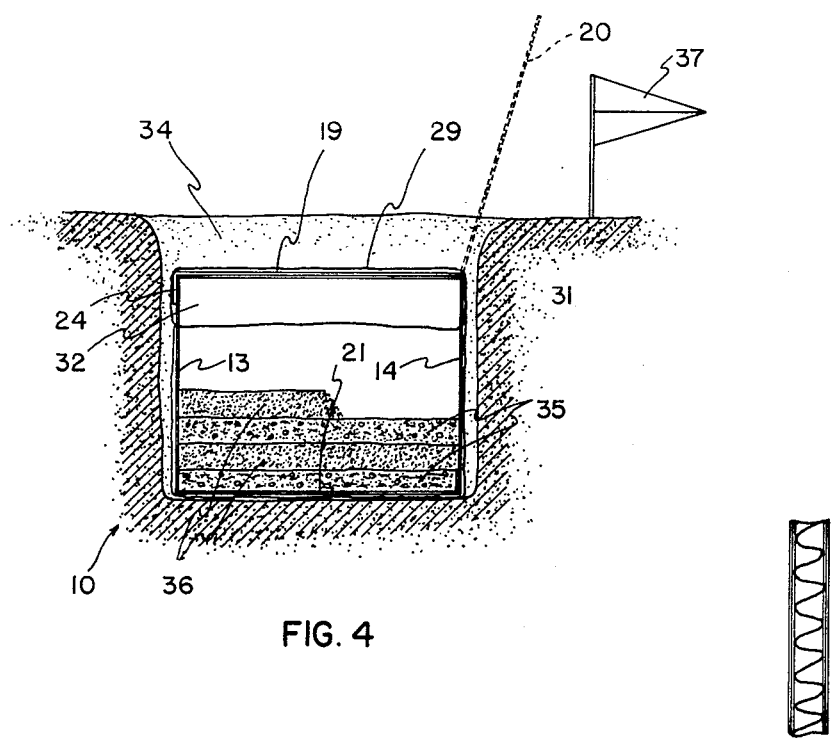
FIG. 4 is a sectional view showing the present invention in field use.

The cover portion 12 of the present invention includes front and rear walls 26 and 27, end walls 28 and 29 and a top 29. Overlapping end flaps 30 and 31 and front flap 33 allow the box portion 11 to be completely encapsulated in a waterproof condition when finally stored as shown in FIG. 4.

To use the field toilet type composting container 10 of the present invention, the flattened box portion 11 and the folded cover portion 12 can be easily backpacked or otherwise transported to any desired back country use sight. Once at the use location, a hole 34 is dug in the ground so that when the composting container 10 of the present invention is inserted therein, the top thereof will be between and 2 and 6 inches below grade level as shown in FIG. 4.

Figure 1:
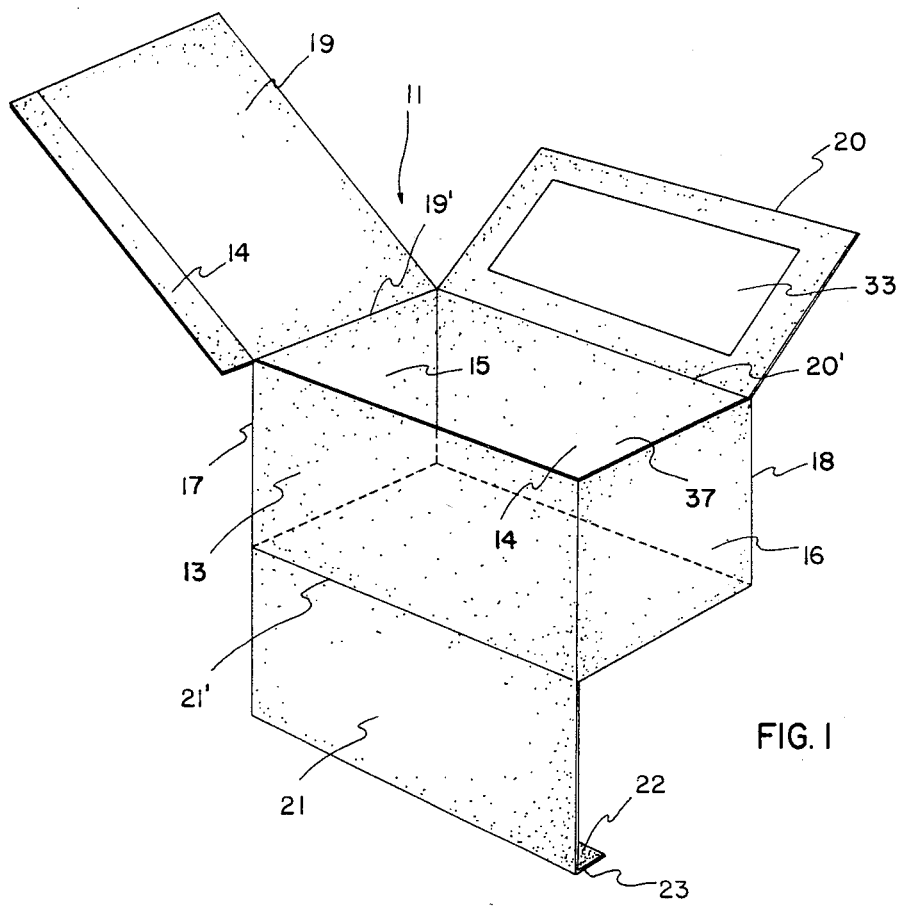
FIG. 1 is a perspective view of the double walled corrugated box portion of the present invention in open position.

The flattened box portion 11 is then be folded open to the approximate position shown in FIG. 1. The bottom 21 is then folded along fold line 21' until the edges thereof lie juxtaposed to ends 15 and 16 with bottom flap 22 lying juxtaposed to rear wall 14 as shown in dotted lines in FIG. 2.

Figure 3:
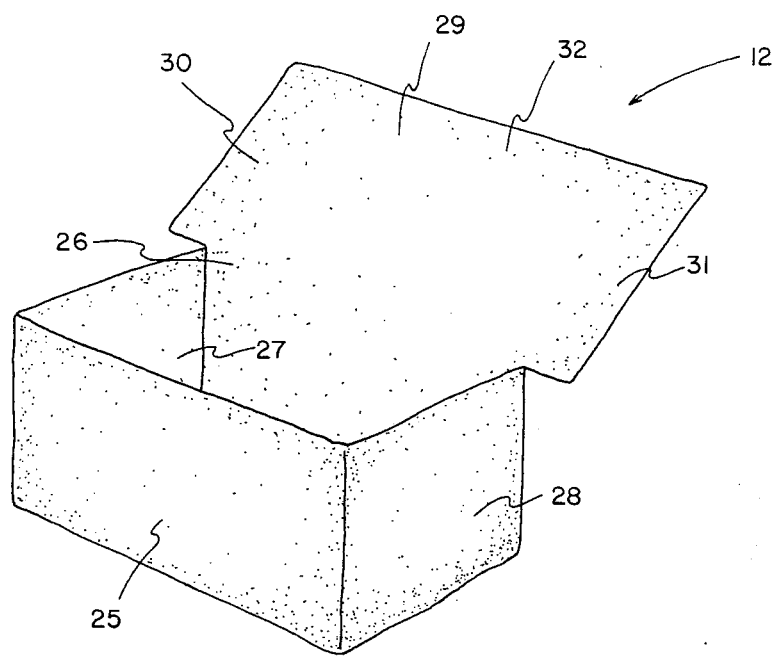
FIG. 3 is a perspective view of the plastic cover portion of the present invention in open position.

The cover portion 12 is next unfolded to the approximate position shown in FIG. 3 and the box portion 11 is inserted therein. The now assembled composting container is placed in the previously dug hole 34. The outer top 20 is then raised to near perpendicular as shown in dotted lines in FIG. 4 to expose the reflective surface 33 provided thereon. This allows the composting field toilet 10 of the present invention to be readily located both during the day, whether in bright or glooming conditions, as well as at night when illumination means such as flashlights are generally used. All during the useful life of the present invention, the reflective surface 33 will be so positioned.

After each deposit of feces 35, a layer of soil 36 between one-half and one inch thick is shoveled over the deposit.

After each use, the inner top 19 is folded along fold line 19' to close the opening 37 in the container 10 to serve as a temporary cover to prevent rain water, insects, animals and other undesirable materials and things from entering such container.

To reuse the container 10, the inner top 19 is simply pulled back and additional feces deposited, followed by a layer of soil and such inner top is then again closed.

Once the composting container 10 has been filled either with alternate layers of feces and soil or finally with just soil when use is prematurely completed, the inner top is closed with flap 24 lying juxtaposed to front wall 13. Next the outer top 20 is folded down along fold line 20' until it lies juxtaposed to inner top 19. The cover top 29 is then folded over outer top 20 of box 11 with flaps 30, 31 and 32 draping over and lying juxtaposed to ends 27 and 28 and front 25 of such cover. Thus a full, water tight composting container is provided.

The last of the soil which was removed from the ground hole 35 is used to cover the composting container in its sealed condition and a biodegradable flag, such as that indicated at 37, is placed adjacent the fill to mark the location to deter others from digging in the same spot.

Over a period of fourteen to eighteen months, both the marker flag 37, the cover portion 12, and the box portion 11 of the present invention 10 will biodegrade and the anaerobic composting process will be completed destroying all intestinal organisms.

From the above it can be seen that the present invention has the advantage of providing a relatively inexpensive and yet highly efficient means of disposing of human feces in remote areas where more conventional toilet facilities are impractical or otherwise unavailable.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. The method of providing field toilet type facilities comprising: transporting a folded inner unit constructed preferably of a double walled corrugated paper type material and an outer cover constructed preferably of a platic type material and both being biodegradable to a use location; unfolding said inner unit to form an inner container having sides, a bottom, and a least one top; unfolding said outer cover; inserting said unfolded inner container into said outer cover to form a combination field toilet and composting container; forming an opening in the earth; placing said combination container in said opening; placing a locating means adjacent said container; deposition alternate layers of feces and soil in said combination containers to fill the same; closing said top of said inner container; folding said outer cover over said inner container; and covering the combination container with soil whereby said feces will be anaerobic compost to destroy all intestinal organisms therein and said combination container will biodegrade.

2. The method of claim 1 wherein the exterior of each of the double walls are coated with a biodegradable coating.

3. The method of claim 2 wherein said coating is shelac.

4. The method of claim 1 wherein said layers of soil deposited alternately with layers of feces are between one-half inch and one inch in thickness.

5. The method of claim 1 wherein said inner container includes at least two tops.

6. The method of claim 5 wherein one of said tops acts as a locator means.

7. The method of claim 6 wherein said locator top includes a reflective material thereon.

8. The method of claim 1 wherein the soil covering said combination container upon completion of the use thereof is between two and six inches thick.

9. The method of claim 8 wherein a biodegradable marker is placed adjacent said soil covered container.

* * * * *